United States Patent Office 3,345,247
Patented Oct. 3, 1967

3,345,247
PLYWOOD BONDED WITH ORGANIC PEROXY-COATED POLY-ALPHA-MONOOLEFIN FILMS AND METHOD OF MAKING THE SAME
John H. Mahar, Scotch Plains, and John W. Schick, Cherry Hill, N.J., assignors to Mobil Oil Corporation, a corporation of New York
No Drawing. Filed Mar. 10, 1965, Ser. No. 438,736
3 Claims. (Cl. 161—247)

This application is a continuation-in-part of copending application Ser. No. 197,586, filed May 25, 1962, now abandoned.

This invention relates to processes for bonding laminated products. It is more particularly concerned with the use of certain poly-α-olefins as the adhesive in producing laminated products.

The term "laminated product" or "laminated products" is used, in this specification and claims, in a generic sense to denote a product made up of two or more relatively thin layers or plies of material bonded together with an adhesive material. Broadly, all the plies can be of the same material or of two or more different materials; such as plastic films or sheets (e.g. polyvinyl chloride, polyfluoroethylene, polymethacrylates, etc.), metal sheets, cloth, and wood plies and veneers.

This invention is particularly directed to laminated wood products. A "laminated wood product" is a "laminated product" wherein at least one ply is wood. Thus, within the scope of the term are contemplated plywoods and veneered wood which consists of a cheaper wood core having bonded to one or both surfaces a veneer of a harder, more expensive wood such as oak, mahogany, hard maple, and cherry. Also contemplated are products consisting of a wood core having bonded to one or both surfaces a film or sheet of a tough plastic material such as polyfluoroethylene.

It has been proposed to bond wood products with polar materials, such as alkyd resins, urea resins, phenolformaldehyde resins, acrylate resins, etc. Many of these binder materials, however, are unsatisfactory for producing products for exterior use, such as marine plywood. Also, many are relatively expensive. Non-polar materials have generally been found unsuited for bonding materials because of the polar nature of the cellulose of the wood.

It has been found that laminated products can be produced relatively simply and inexpensively. It has been discovered that laminated products, particularly laminated wood products, bonded with certain poly-α-olefins are strong and suited for exterior use.

Accordingly, it is a broad object of the invention to provide laminated products and a method for preparing them. Another object is to produce plywood and laminated compressed wood of great strength. A specific object is to produce laminated wood products suitable for exterior use. Other objects and advantages of this invention will become apparent to those skilled in the art from the following detailed description.

In general, the present invention provides a method for producing laminated products that comprises placing between the plies of said products a solid polymer or copolymer of α-monoolefin monomers having between 2 and 8 carbon atoms, and heating at a temperature of between about 200° F. and about 500° F., under a pressure of between about 0 p.s.i.g. and about 1000 p.s.i.g., and for a period of time of between about 1 minute and ½ hour, depending on thickness of sample.

The bonding materials contemplated herein are solid polymers or copolymers of α-mono-olefins having between 2 and 8 carbon atoms. Generally, they will have molecular weights above 10,000, and melt at temperatures between about 200° F. and about 500° F. Although atactic polymers can be used, it is preferred to use the crystalline polymer. The polyolefin resins contemplated herein can be made by a number of processes well known in the art. Typical processes involve the use of metal halide catalysts, such as aluminum chloride and titanium chloride, metal hydrides, metal alkyls, etc. The method by which the polyolefin resin is produced is not, however, an important feature of this invention and it is not to be limited by any polymerization method. In a preferred embodiment of this invention the bonding material is one or more films of polymer or copolymer of α-mono-olefins having 2 to 8 carbon atoms. Especially advantageous results are obtained by coating the surfaces of the film with an organic peroxide cross-linking agent.

As has been mentioned hereinbefore, the laminated wood products of this invention include laminated wood, veneered wood, and plywood. They are all prepared by the same general method of placing a polyolefin resin between the plies of the laminated wood product and heating, usually under pressure.

Plywoods and other laminated wood products are made, in accordance with one embodiment of this invention, by placing between the wood ply and other ply material if used, polymer from a thick suspension of polyolefin resin in water. The plies are stacked one on top of another to the desired thickness, usually in the case of plywoods with the direction of the grain of adjacent sheets oriented at right angles. The stack of sheets or plies is then heated under pressure as aforedescribed.

It has been found, however, that plywoods and other laminates can be produced without resorting to spray or soaking techniques. This is effected by building up plies to the desired thickness, placing between the plies, in contact with the surfaces thereof, at least one sheet or film of polyolefin resin. The resultant pile is then formed into laminated wood product by heating under pressure. In order to further improve properties, a suitable organic peroxide crosslinking agent can be employed by application to the surfaces of the polymer films. Incorporation directly into the polymer films in the film-forming operation produces weaker bonds and is undesirable. Although a single film of desired bond thickness, surface-coated with organic peroxide cross-linking agent, can be used, superior bonds are effected by using a plurality of films each surface-coated with organic peroxide. Thus, instead of using for example a single film of 6 mils thickness, superior bonds are obtained by using three 2-mil films. The amount of organic peroxide cross-linking agent used will be between about 0.5 percent and about 10 percent of the polyolefin film weight, and preferably about 2.5 percent of the film weight.

To form the finished laminated product, the stack of plies and bonding agent is placed under pressures of from about 0 p.s.i.g. to about 1000 p.s.i.g. The temperature of the mold must be sufficiently above the melting point of the polyolefin resin employed, i.e., between about 20° F. and about 50° F. above the melting point. In general, and depending upon the particular polyolefin resin used, molding will be carried out at temperatures between about 200° F. and about 500° F. The molding temperature should not exceed temperatures in the order of about 500° F., at which charring of the wood may occur. The molding time will be dependent upon the temperature and the flow characteristics of the polyolefin resin. Sufficient time must be allowed to permit even flow. This time can vary between about one minute and about one-half hour. In general practice, molding temperatures will be selected that the molding time will be between about 10 and about 20 minutes.

The amount of polyolefin resin that is placed between the plies of the laminated product, will be between about 5% and about 30% by weight of the finished board. Thus, in accordance with this invention, there is porduced a finished board comprising between about 5% and about 30% by weight of a polyolefin resin as defined herein and between about 95% and about 70% by weight of wood or other ply material, if used.

PLYWOOD

As mentioned hereinbefore, isotactic polypropylene is an effective binder for bonded wood products. The strength of the bond can be improved by using stereoregular copolymers of α-olefins. This is illustrated in the following examples.

Example 1

Test specimens were prepared using an isotactic polypropylene binder in various binder spreads. The specimens were prepared by placing a measured amount of binder between two thin oak veneers and heating under pressure. The bonded product specimen was glued to larger oak blocks with a commercial adhesive and tested in a tensile testing machine. Shear strength was measured by applying force in a direction parallel to the bond surface. Tensile strength was determined by applying force perpendicular to the bond surface. The binder used in the products of this example had 94.7% isotacticity, a 55% crystallinity, and a Melt Index (g./10 min.-condition $I_2$ 230° C. 2160 g.) of 2.15. Pertinent data are set forth in Table I.

Example 2

Another series of bonded product specimens were prepared and tested, as described in Example 1. The polypropylene binder used in the products of this example had 97% isotacticity, a 60% crystallinity, and a Melt Index (g./10 min.-condition $I_2$ 230° C. 2160 g.) of 5.68. Pertinent data are set forth in Table I.

Example 3

Using the procedures described in Example 1, a series of bonded product sepcimens were prepared and tested. The binder used in the products of this example was a stereoregular copolymer containing 95 weight percent propylene and 5 weight percent butene-1. Pertinent data are set forth in Table I.

TABLE I

| Example | Binder Spread, g./in.$^2$ | Tensile Stress at Failure, p.s.i. | Shear Stress at Failure, p.s.i. |
|---|---|---|---|
| 1 | 0.066 | 114 | |
| | 0.082 | 80 | |
| | 0.129 | | 550 |
| | 0.100 | 105 | |
| 2 | 0.667 | | 253 |
| | 0.613 | | 453 |
| | 0.097 | 220 | |
| 3 | 0.141 | | 1,550 |
| | 0.088 | | 1,100 |

It will be noted from the data in Table I that isotactic polypropylenes are efficient wood binders. In addition to the foregoing tests, tests were run using polypropylenes having varying isotactic content. No significant differences were found for polypropylenes having isotactic contents between 60 and 95%. The more atactic polypropylenes failed by plastic deformation, while the more crystalline isotactic material did not.

As noted from the data for Example 3, a copolymer having about 5% butene-1 had improved binding properties. As is shown in the following example, this appears to be about optimum for propylene-butene copolymers.

Example 4

A series of stereoregular polymers and copolymers of propylene and butene-1 having varying content of butene-1 were tested for shear strength. The procedures used were those described in Example 1. Pertinent results noted were:

| Percent butene-1 in polymer: | Shear strength, p.s.i. |
|---|---|
| 0 | 410 |
| 5 | 1060 |
| 10 | 540 |
| 25 | 350 |

When the data in Example 4 were plotted, percent butene vs. shear, it was found that advantageous results were obtained with propylene-butene-1 copolymers containing between about one percent and about 8 percent butene-1. The most effetcive binder had about 5 percent butene-1.

Example 5

In order to determine the effect of binder spread on shear strength, a series of specimens were tested using the 95% propylene-5%-butene-1 copolymer. The amount of binder was varied. The following data were obtained:

| Binder spread, g./in.$^2$: | Shear strength, p.s.i. |
|---|---|
| 0.042 | 930 |
| 0.047 | 865 |
| 0.050 | 900 |
| 0.085 | 1110 |
| 0.087 | 1110 |
| 0.141 | 1550 |

When plotted, the relationship between spread and shear strength was substantially linear.

Polyethylene also is an effective binder for bonded wood products. The bond strength can be improved by cross-linking in situ. Further, greater bond strength is achieved by using a plurality of films to effect the desired bond thickness, instead of using a single film. The following examples are illustrative.

Example 6

Using procedures similar to those described in Example 1, four series of shear strength test specimens were prepared using maple veneers ½8″ thick. In one series desired bond thickness was obtained by using multiples of linear polyethylene films each 2 mils thick. Another similar series was prepared, except that each 2-mils film was surface-coated with about 2.5 weight percent dicumyl peroxide cross-linking agent.

A further series was prepared in which the desired bond thickness was obtained with a single linear polyethylene film. Another similar series was prepared, except that the film was surface-coated with about 2.5 weight percent dicumyl peroxide.

Each specimen was prepared by heating at 400° F. for 10 minutes, under pressure just sufficient to maintain contact of the maple veneers with the polyethylene binder. Pertinent data are set forth in Table II.

TABLE II.—SHEAR STRENGTH OF POLYETHYLENE-WOOD BONDS

| Bond [1] Thickness, mils | Shear Stress, p.s.i. | | | |
|---|---|---|---|---|
| | Multiple 2 mil Films | | Single Films | |
| | Cross linked [2] | Not Cross-linked | Cross linked [2] | Not Cross-linked |
| 2 | 1,058 | 439 | 1,058 | 439 |
| 4 | 1,425 | 843 | 1,142 | 793 |
| 6 | 1,465 | 770 | 1,391 | 596 |
| 8 | 1,404 | 885 | 1,377 | 990 |
| 10 | 1,405 | 1,059 | 1,498 | 710 |

[1] Bond formed at 400° F. for ten minutes.
[2] 2½% dicumyl peroxide distributed evenly over all film surfaces.

From the data set forth in Table II, it will be evident that increasing film thickness increases the bond strength when polyethylene alone is used with higher bond strength achieved when multiple films were used. Greater strength for a given film thickness is effected by cross-linking. A film thickness of 3–6 mils appears to be optimum for cross-linked polyethylene. A decrease in thickness below this gives significantly weaker bonds. Increase above 6 mils gives relatively small improvement in bond strength. A 3–6 mlls thickness is equal to a spread of 5–10 g./ft.$^2$. This is extremely low, compared to thermosetting urea-formaldehyde or phenol-formaldehyde resins which require a binder spread of 15–20 g./ft.$^2$.

As mentioned hereinbefore, the organic peroxide cross-linking agent should be applied to the surfaces of the polyolefin film. When it is incorporated internally into the film, inferior bonds are obtained. This is shown in the following example.

*Example 7*

Polyethylene film was prepared, in which 3 weight percent of 2,5-di (t-butylperoxy) hexyne-3 was added to polyethylene powder prior to the film-forming operation. Using this film having the organic peroxide cross-linking agent internally dispersed therein, a series of shear-test specimens was prepared with one or more film layers. The procedure was that described in Example 6. Pertinent data and test results are set forth in Table III.

TABLE III.—SHEAR STRENGTH OF POLYETHYLENE BONDS

[Crosslinking agent incorporated internally]

| Crosslinking Agent | Number of Film Layers | Thickness of Poly C$_2$= Layer, mils | Shear Stress, p.s.i. |
|---|---|---|---|
| Lupersol 130 [1] | 1 | 2.4 | 250 |
|  | 2 | 3.8 | 301 |
|  | 3 | 5.1 | 341 |
|  | 4 | 6.6 | 413 |

[1] Trade-name for 2,5-di (t-butylperoxy) hexyne-3.

*Example 8*

Fifteen 3-ply plywoods were made using a polyethylene bond (glue line) to bond Douglas Fir wood plies. In each case, the bond was made up of one or more polyethylene films of various thicknesses. Each film was surface coated with varying amounts of organic peroxide cross linking agent. In most plywoods, dicumyl peroxide was used, except as noted in Table IV, for two plywoods in which 2,5-dimethyl-2,5-di (t-butylperoxy) hexane was used. The make-up of each polyethylene bond (number of films, film thickness, and amount and kind of peroxide) are set forth in Table IV.

In making each board a polyethylene bond was placed on an exterior wood ply. Then, another interior wood ply was placed upon this, followed by another polyethylene bond and a third, exterior wood ply. The board size was about 18″ x 12″ and the exterior wood ply was oriented with its grain running at right angles to the grain of the exterior wood plys. The plywood "sandwich" was hot pressed at about 400° F. for ½ hour. Pressure was adjusted to hold the plies together without squeezing out the binder. Each board was tested in the manner prescribed by ASTM D805–52 and test results are set forth in Table IV. For comparison, plywoods made using commercial resins were tested.

From the data in Table IV it will be apparent that excellent plywoods can be made, in accordance with this invention. They compare favorably with plywood bonded with phenolformaldehyde resin binder, i.e., exterior or marine grade plywood. Indeed, most were superior in the amount of wood failure. This, as is well known, shows that the bond is stronger than the wood ply.

As was discussed hereinbefore, laminated wood products are contemplated wherein at least one ply is a material other than wood. Typical cases are those in which a wood ply or core has bonded to its surface a material, such as a tough plastic, for protective purposes. Such a

TABLE IV.—PLYWOOD COMPOSITION AND STRENGTH DATA

| Adhesive | Phenol Form-aldehyde | Urea Form-aldehyde | Polyethylene | | | | | | | | | | | | | | |
|---|---|---|---|---|---|---|---|---|---|---|---|---|---|---|---|---|---|
| Films/Glue Line | | | 1 | 1 | 1 | 1 | 1 | 1 | 1 | 1 | 2 | 3 | 4 | 3 | 3 | 3 | 3 |
| Thickness Each Film, Mils | | | 2 | 4 | 6 | 8 | 10 | 2 | 2 | 2 | 2 | 2 | 4 | 2 | 2 | 2 | 2 |
| Crosslinking Agent, percent [1] | | | 4 | 4 | 4 | 4 | 4 | 4 | 4 | 4 | 4 | 4 | 4 | 8 | 4 | 4 | 4 |
| Tensile Tests (Glue Shear Tests): | | | | | | | | | | | | | | | | | |
| Stress at Failure, p.s.i.: | | | | | | | | | | | | | | | | | |
| Dry | 163 | 118 | 75 | 119 | 149 | 170 | 183 | 150 | 145 | 159 | 153 | 178 | 143 | 143 | 132 | 167 | 162 |
| Cold Soak Cycle [4] | 169 |  | 18 | 26 | 102 | 164 | 156 | 133 | 112 | 16 | 122 | 165 | 133 | 135 | 139 | 138 | 167 |
| Boil Cycle [6] | 116 |  | 0 | 20 | 70 | 126 | 129 | 101 | 93 | 129 | 113 | 129 | 104 | 104 | 106 | 128 | 128 |
| Wood Failure, percent: | | | | | | | | | | | | | | | | | |
| Dry | 28 | 8 | 15 | 43 | 86 | 98 | 79 | 85 | 89 | 98 | 98 | 73 | 84 | 67 | 77 | 96 | 96 |
| Cold Soak Cycle [6] | 23 | [5] | 2 | 7 | 23 | 59 | 55 | 68 | 30 | 64 | 65 | 47 | 61 | 70 | 58 | 79 | 69 |
| Boil Cycle [6] | 10 | [5] | 0 | 0 | 2 | 40 | 43 | 58 | 22 | 77 | 74 | 35 | 62 | 55 | 58 | 45 | 52 |
| Static Bending Tests: | | | | | | | | | | | | | | | | | |
| Modulus of Rupture, M p.s.i. | 12.0 | 12.2 | 7.6 | 7.4 | 10.2 | 10.2 | 11.4 | 13.1 | 12.7 | 11.0 | 8.3 | 10.2 | 10.7 | 10.8 | 11.9 | 10.6 | 10.6 |
| Modulus of Elasticity, M p.s.i. | 1,873 | 1,863 | 1,565 | 1,410 | 1,530 | 1,785 | 1,610 | 1,830 | 1,740 | 1,600 | 1,690 | 1,680 | 1,660 | 1,730 | 1,740 | 1,685 | 1,920 |

[1] Dicumyl peroxide except as noted.  [2] DiCup applied only to interior surfaces.  [3] 2,5-dimethyl-2,5-di(t-butylperoxy)hexane.  [4] Soaked 60 hours at 70° F., dried 8 hours at 140–150° F.; soaked 16 hours, dried 8 hours; soaked 16 hours, dried 8 hours; soaked 16 hours, tested wet.  [5] Fell apart.  [6] Boiled 4 hours, dried 20 hours at 140–150° F.; boiled 4 hours, tested wet.

bonded wood product is illustrated in the following example.

Example 8

On the surface of a sheet of Douglas Fir plywood was placed a 1.5-mils polyethylene film, that was surface-coated with 5 weight percent of 2,5-di(t-butylperoxy) hexyne-3. Then, there was placed, on the coated polyethylene film, a 1.5-mils film of poly(monofluoroethylene). The resulting assembly was hot pressed at 350° F. for 15 minutes. The press temperature was reduced to about 200° F. before removing the coated plywood product. When an effort was made to strip off the poly(monofluoroethylene) film, surface wood was removed, instead, along with the poly(monofluoroethylene)-polyethylene film composite.

Although the present invention has been described with preferred embodiments, it is to be understood that modifications and variations may be resorted to, without departing from the spirit and scope of this invention, as those skilled in the art will readily appreciate. Such variations and modifications are considered to be within the purview and scope of the appended claims.

What is claimed is:
1. A method for producing plywood that comprises:
   (1) placing between the wood plies at least one film of a solid polymer selected from the group consisting of polymers and copolymers of alpha-mono-olefins having between 2 and 8 carbon atoms and which has been surface-coated with an organic peroxy cross-linking agent; and
   (2) heating at a temperature of between about 200° F. and about 500° F., under a pressure of between about 0 p.s.i.g. and about 1000 p.s.i.g., and for a period of time of between about one minute and about 30 minutes.
2. The method defined in claim 1, wherein there are placed between said wood plies a plurality of polyethylene films, each surface coated with an organic peroxy cross-linking agent.
3. A plywood having wood plies bonded with between about 5 percent and about 30 percent, by weight of the finished board, of at least one film of a solid polymer selected from the group consisting of polymers and copolymers of alpha-monoolefins having between 2 and 8 carbon atoms, surface cross-linked with an organic peroxide.

References Cited
UNITED STATES PATENTS

| | | | |
|---|---|---|---|
| 2,158,908 | 5/1939 | Ottinger | 161—268 |
| 2,826,570 | 3/1958 | Ivett. | |
| 2,936,261 | 5/1960 | Cole | 156—313 |
| 2,952,578 | 9/1960 | Carlson. | |
| 3,121,698 | 2/1964 | Orsino et al. | 117—143 |
| 3,234,197 | 2/1966 | Baum | 161—250 |

ALEXANDER WYMAN, *Primary Examiner.*

R. H. CRISS, *Assistant Examiner.*

UNITED STATES PATENT OFFICE
CERTIFICATE OF CORRECTION

Patent No. 3,345,247  October 3, 1967

John H. Mahar et al.

It is hereby certified that error appears in the above numbered patent requiring correction and that the said Letters Patent should read as corrected below.

Column 3, line 1, for "porduced" read -- produced --; line 39, for "sepcimens" read -- specimens --; column 4, line 14, for "effetcive" read -- effective --; column 5, line 7, for "mlls" read -- mils --; column 6, TABLE IV, eleventh column, line 5 thereof, for "16" read -- 160 --.

Signed and sealed this 15th day of October 1968.

(SEAL)
Attest:

Edward M. Fletcher, Jr.  EDWARD J. BRENNER
Attesting Officer  Commissioner of Patents